United States Patent [19]

Chou

[11] Patent Number: 5,902,869
[45] Date of Patent: *May 11, 1999

[54] THERMALLY STABLE ETHYLENE/ACID COPOLYMERS

[75] Inventor: Richard Tien-Hua Chou, Wilmington, Del.

[73] Assignee: E. I. du Pont de Nemours and Company, Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/780,372

[22] Filed: Jan. 9, 1997

Related U.S. Application Data

[63] Continuation-in-part of application No. 08/620,188, Mar. 22, 1996, abandoned.

[51] Int. Cl.[6] ................................................ C08F 222/06
[52] U.S. Cl. ........................ 526/272; 526/266; 526/271; 526/318.4; 526/318.6; 526/348.8
[58] Field of Search ............................... 526/318.6, 272, 526/348.8, 271

[56] References Cited

U.S. PATENT DOCUMENTS

| | | | |
|---|---|---|---|
| 3,264,272 | 8/1966 | Rees | 260/78.5 |
| 4,351,931 | 9/1982 | Armitage | 526/227 |
| 4,690,981 | 9/1987 | Statz | 525/329.6 |
| 4,804,703 | 2/1989 | Subramanian | 524/444 |
| 5,130,372 | 7/1992 | Lences et al. | 525/183 |
| 5,276,135 | 1/1994 | Powell | 528/483 |

FOREIGN PATENT DOCUMENTS

| | | |
|---|---|---|
| 0061038 A1 | 9/1982 | European Pat. Off. . |
| 0178643A2 | 4/1986 | European Pat. Off. . |
| 0228916A2 | 7/1987 | European Pat. Off. . |
| 0275518 A1 | 7/1988 | European Pat. Off. . |
| 0356978A2 | 3/1990 | European Pat. Off. . |
| 0382048 A2 | 8/1990 | European Pat. Off. . |
| 0473823 A1 | 3/1992 | European Pat. Off. . |
| 1520506 | 2/1970 | Germany . |
| 3404742 A1 | 8/1985 | Germany . |
| 83-109721 | 6/1983 | Japan . |
| 63-8458 | 1/1988 | Japan . |
| 9500471 | 10/1996 | Netherlands . |
| WO 92/15644 | 9/1992 | WIPO . |
| WO 96/23009 | 8/1996 | WIPO . |

*Primary Examiner*—Fred Zitomer
*Attorney, Agent, or Firm*—Monte R. Browder

[57] ABSTRACT

Ethylene/(meth)acrylic acid copolymers which have improved melt-thermal stability are described. The copolymers contain an intrachain anhydride unit derived from an additional comonomer which is an anhydride or anhydride forming comonomer, such as maleic anhydride and maleic acid or its monomethyl ester, present at a level of 0.05 to 3.0 weight percent. Measured properties of the terpolymers, other than thermal stability, are about the same as comparable ethylene/(meth)acrylic acid copolymers with no anhydride monomer.

6 Claims, No Drawings

THERMALLY STABLE ETHYLENE/ACID COPOLYMERS

This is a continuation-in-part of application Ser. No. 08/620,188 filed Mar. 22, 1996, now abandoned.

BACKGROUND OF THE INVENTION

1. Field of the Invention

The invention relates to compositions of ethylene/methacrylic acid and acrylic acid copolymers which have improved melt-thermal stability. More particularly, it relates to such copolymers which additionally have small amounts of anhydride or anhydride forming comonomers copolymerized within the polymer chain.

2. Description of Related Art

Copolymers of ethylene and the monocarboxylic acids methacrylic or acrylic acid only are well known. Commercially such dipolymers typically contain at least about 75 weight percent and up to about 92 weight percent ethylene. They are used for molding, packaging and some adhesive applications. Examples of such ethylene/acid copolymers include those sold under the tradename, Nucrel®, which are produced by E. I. du Pont de Nemours and Company. Such ethylene/acid copolymers are described in U.S. Pat. No. 4,351,931 (Armitage).

The above patent does not disclose use of acid comonomers other than acrylic and methacrylic acid, and in practice these monocarboxylic acids are the only commercially important acid comonomers in ethylene/carboxylic acid copolymers. However, other acid comonomers which polymerize with ethylene, and the resulting copolymers have been disclosed, for example, in U.S. Pat. No. 3,264,272 (Rees). Copolymers containing 0.2 to 25 mole percent of dicarboxylic acid comonomers such as itaconic, maleic, fumaric acids, their monoalkyl esters such as methyl hydrogen maleate, and their anhydrides such as maleic anhydride are disclosed. Copolymers containing ethylene and 6 weight percent itaconic acid, and copolymers with 6 weight percent maleic anhydride are exemplified. No copolymers with both monocarboxylic acid and dicarboxylic acid comonomers (or their derivatives) are specifically disclosed, though terpolymers with non-acid termonomers such as alkyl acrylates and methacrylates are disclosed. In this patent, the acid copolymers are precursor polymers for ionomers.

Terpolymers of ethylene, (meth)acrylic acid and alkyl acrylates form a class of acid copolymers with lower modulus and good low temperature properties. A method of preparing these acid copolymers is disclosed in U.S. Pat. No. 4,690,981. They are used principally to form 'soft' ionomers by neutralization of the acid. However, these acid copolymers with acrylates also find utility in their own right.

Ethylene/(meth)acrylic acid copolymers, including terpolymers with an alkyl acrylate are deficient in melt-thermal stability above about 240° C. Melt flow starts to decrease. This is believed to be due to anhydride formation from two carboxylic acid groups in adjacent chains which form crosslinks, and hence reduce tractability and melt flow. This results in increased gel, decreased melt drawability, and difficult extruder purging after melt processing in an extruder.

Maleic anhydride as a monomer grafted onto existing polymers is well known as a means of obtaining a polar functionality in polyolefin polymers. Such graft-copolymers are useful as compatibilizing agents and as components of hot-melt adhesives. There are also disclosures of maleic anhydride grafted ethylene/monocarboxylic acid copolymers. Typical is JP-83-109721, which discloses laminates where one layer is an ethylene/monocarboxylic acid polymer grafted with 0.05 to 5.0% maleic anhydride. However, grafting requires an additional step after regular polymerization, and in addition is subject to considerable variation in product obtained, as well as changes in properties from ungrafted material, particularly a reduction in melt flow. Reduction in melt flow is the very factor which melt-thermal stabilization seeks to avoid.

The problem of melt-thermal instability has been well recognized, and various attempts have been made to solve it. U.S. Pat. No. 4,594,382 (Hoening et al.), discloses that addition of 5% or less of a hydrated compound which decomposes at from 100 to 300° C., such as hydrated alumina, improves the melt-thermal stability.

A related approach is disclosed in U.S. Pat. No. 5,276,135 (Powell), where allowing a small controlled increase in the (low) moisture content over the amount which normally exists after air and nitrogen purging, improves melt-thermal stability. This patent also discloses that low temperature polymerization of ethylene/(meth)acrylic acid copolymers, below the typical 200–270° C., produces polymer with greater melt-thermal stability. This is said to be due to the greater number of adjacent carboxylic acid units formed when low temperature polymerization is used, adjacent monocarboxylic acid groups reacting together, releasing water and forming intrachain anhydride groups in preference to interchain anhydride groups when no diads are present. However, low temperature polymerization strongly decreases productivity, in addition to making polymer with quite different mechanical properties than polymer made at normal polymerization temperatures.

All these approaches are presumed to be effective because water or released water suppresses interchain anhydride crosslink formation. They have the disadvantages of low productivity, change in the properties of the polymer, or need for a significant amount of a particulate additive.

There is a need for a method of improving the melt-thermal stability of ethylene/(meth)acrylic acid copolymers, including terpolymers with alkyl acrylates, which does not involve (i) reducing productivity during preparation of the copolymer, (ii) a change in mechanical properties, (iii) the difficulty of producing polymer with controlled moisture levels, or (iv) does not require use of an additive.

SUMMARY OF THE INVENTION

The invention depends on the recognition that one can suppress unwanted anhydride formation (interchain), not just by encouraging the formation of, but by actually directly introducing anhydride units intrachain. This can be achieved by introducing by copolymerization, anhydride or anhydride producing monomer into the polymer chain itself. Suitable monomers for this purpose are dicarboxylic acid anhydrides, dicarboxylic acids themselves, or dicarboxylic acid half esters.

More specifically, the invention is a composition, comprising:

an ethylene/(meth)acrylic acid copolymer having from 5 to 25 weight percent (meth)acrylic acid derived units, optionally also containing up to 40 weight percent of an alkyl acrylate whose alkyl groups have from I to 8 carbons, the acid copolymer having additionally copolymerized intrachain units derived from a further comonomer or comonomers selected from the group consisting of imaleic anhydride, itaconic anhydride, methyl hydrogen maleate, ethyl hydrogen maleate, maleic acid, itaconic acid, and a mixture of any of these monomers, the intrachain units from the further comonomer or comonomers being present at a total level of 0.05 to 3.0 weight percent of the copolymer.

DETAILED DESCRIPTION OF THE INVENTION

In this disclosure, the term copolymer means a polymer produced from more than one monomer. Copolymers may be dipolymers having only two monomers copolymerized together, terpolymers or have more than three monomers. The copolymers of the invention are 'direct' copolymers, that is to say they are not graft-copolymers where monomer is polymerized in the presence of polymer and the resulting polymer attaches to the existing polymer chain. In this regard, the comonomers produce single 'intrachain' units in the copolymer, as distinct from either polymeric 'side-chain' units or single 'crosslink' units.

Copolymers have units derived from the various comonomers polymerized. It is common to say polymers 'contain' a given monomer, polymers 'having' a certain amount of a given monomer, or polymers 'of' a given monomer, all being commonly accepted shorthand for meaning units derived from that monomer.

The ethylene/monocarboxylic acid copolymers of this disclosure have as the monocarboxylic acid acrylic acid or methacrylic acid or both. These three possibilities are conveniently referred to in the disclosure by using the term 'ethylene/(meth)acrylic acid copolymers'. These copolymers can also include up to 40 weight percent of an alkyl acrylate have an alkyl group with from 1 to 8 carbon atoms.

The term 'intrachain' in this disclosure is used to distinguish only from interchain units which are crosslink units. The intrachain anhydride ring does not necessarily include two backbone carbon atoms. Thus in the case of maleic anhydride the unit will include two backbone carbon atoms, but in the case of itaconic acid which is methylene succinic acid, or its anhydride, the anhydride unit will not include two backbone carbon atoms.

The 'further comonomer(s)' of the copolymers of this invention, that is to say in addition to the ethylene, (meth) acrylic acid and optional alkyl acrylate, are monomers which have anhydride units or can readily directly lead to intrachain anhydride units in the polymer. Suitable anhydride monomers are dicarboxylic acid anhydrides such as maleic anhydride and itaconic anhydride. Monomers which directly yield intrachain anhydride units are dicarboxylic acids such as maleic acid, itaconic acid, fumaric acid, and half esters of these acids. Such monomers have acid groups on adjacent carbons or an acid and an ester group on adjacent carbons. The preferred comonomers are maleic anhydride and ethyl hydrogen maleate. Most preferred is maleic anhydride. When the monomers are diacids they readily dehydrate and produce primarily intrachain anhydride units, in contrast to forming interchain (crosslink) anhydride units as do monocarboxylic acid units.

The amount of the anhydride or anhydride producing comonomer is from 0.05 to 3.0 weight percent, preferably 0.3 to 2.0 weight percent, and more preferably from 0.3 to 1.5, most preferably from 0.5 to 1.2 weight percent. Below 0.05 there is little or no improvement in melt-thermal stability. Above 3.0 percent there are diminishing returns, as well as increasing cost in producing the copolymer, as well as the beginnings of property changes in the polymer.

The invention is applicable to copolymers containing from 5 to 30 weight percent ((meth)acrylic acid, preferably from 8 to 22 weight percent, and optionally up to 40, preferably up to 30 weight percent of an alkyl acrylate, the copolymers having an MI of from about 100 to about 0.1. Preferably the copolymers will have at least 50 weight percent ethylene when an alkyl acrylate is present and at least 75 percent ethylene when no alkyl acrylate is present. The invention is particularly useful for low MI polymers, since when crosslinking occurs with low MI (high molecular weight) polymers, the percent change in viscosity for a given molar amount of crosslinking is greater than with a high MI polymer. It is thus particularly useful for acid copolymers having an MI of less than 20, and more particularly for copolymers having an MI of less than 10. The invention is very useful for the more common acid copolymers having no softening alkyl acrylate present. The invention does not include neutralized acid copolymers, i.e., ionomers. Iretain more water, and for this and other reasons melt stability falls into a different category.

While not committing to any particular theory, it is believed that the presence or formation of intrachain anhydride units suppresses formation of further anhydride units of the interchain type, possibly partly as a result of equilibrium considerations. Anhydride units formed from (meth) acrylic acid units are more likely to be unwanted interchain anhydride units which increase viscosity, whereas intrachain anhydride units have virtually no effect on viscosity. Because of the particular reactivities of ethylene and (meth) acrylic acid, the presence of two adjacent acid units, at least for polymers with less than 20 weight percent acid, is rare unless produced at low temperatures where productivity is drastically reduced. Even then, such acid groups will not be pendent from adjacent intrachain carbons, but on alternate carbon atoms along the chain.

The copolymers of this invention are produced by standard free radical copolymerization methods, under high pressure, operating in a continuous manner. Monomers are fed into the reaction mixture in a proportion which relates to the monomer's reactivity and the amount desired to be incorporated. Unreacted monomers are recycled. In this way, uniform, near-random distribution of monomer units along the chain is achieved Polymerization in this manner is well known, and is described in U.S. Pat. No. 4,351,931 (Armitage) which is hereby incorporated by reference. At high acid levels it is an advantage to use so-called co-solvent technology to prevent phase separation of monomer and polymer. This is fully described in U.S. Pat. Nos. 5,028,674 (Hatch et al.), and 5,057,593 (Statz), both of which are also hereby incorporated by reference.

While the monocarboxylic acids and dicarboxylic acids may differ somewhat in reactivity, they may be fed together as a mixed solution. The reactivity of the acids is so great compared with ethylene that all acid is largely converted as it is introduced at the required rate for the amounts of monomer wanted in the polymer.

EXAMPLES

Experimental polymers containing either maleic anhydride or methyl hydrogen maleate were prepared in a pilot plant unit in the manner described above. Control samples without the anhydride or intrachain anhydride-forming monomer were also made and compared, and comparision was also made with commercial samples of comparable composition. The maleic anhydride or ethyl hydrogen maleate was mixed with the methacrylic or acrylic acid, forming a homogeneous solution for feeding to the pilot plant autoclave which was operated at 240° C. and 27,000 psi.

Composition of the polymers was determined using infrared absorbance. The methacrylic or acrylic acid content was determined at 940 cm−1 and the anhydride content at 1783 cm−1. To insure the anhydride forming monomer ethyl hydrogen maleate was converted to anhydride for IR analysis, the pressed film sample was treated at 290° C. for one minute. It is believed that this treatment converts essentially 100% of the monomer to anhydride. A list of samples tested is given in Table 1. The ethyl hydrogen maleate (MAME) content shown refers to the weight percent of MAME calculated from the amount of anhydride determined by IR.

Melt-thermal stability was determined by comparing Melt Index (MI) at 190° C., using ASTM D- 1238, condition E, before and after a heat treatment at 290° C. for 60 minutes in a melt indexer barrel. Prior to all MI measurements, samples were dried for two days in a vacuum oven at 60° C. The Melt Index Ratio (MIR) is the ratio of MI after treatment to MI before treatment. The higher the value, the less change, and more melt-thermally stable the polymer.

It is clearly important that the presence of anhydride at the levels used does not materially change properties (other than melt-thermal stability) compared with comparable ethylene/(meth)acrylic acid copolymers without intrachain anhydride units. In order to determine that the copolymers with and without anhydride had comparable properties, adhesion to LLDPE and aluminum foil were tested. Adhesion to these substrates was measured as follows. Films of the polymers, about 2 mil thick, were individually heat sealed to each substrate using a Sentinel Heat Sealer under the following conditions: 0.5 seconds dwell time, 30 psi jaw pressure, both jaws heated. The films were sealed to the LLDPE using tri-foil as a carrier on each side of the films. For sealing the films to foil, the tri-foil was used on the film side only. The adhesion test was performed using an Instron with the samples T-peeled at 10 inches per minute. Flexural modulus was also measured on the samples using ASTM D790. The results of the adhesion test, and the flexural modulus values determined are given in Table 2.

While comparable adhesion and flexural modulus to control samples does not ensure that all properties remain the same, adhesion and flexural modulus are important properties, and are sensitive to acid content, and their measured values can provide a good indication if any substantial change in other properties is likely to have taken place with anhydride modification.

Table 1 indicates that the presence of the anhydride or anhydride producing monomer improves melt-thermal stability significantly. While there is not a rigid quantitative trend, in terms of improved stability with increasing level of third monomer, values of MIR for controls, either standard plant material or experimental samples, are all lower than polymers with maleic anhydride or ethyl hydrogen maleate, and generally significantly lower. Of the two stabilizing monomers, based on the limited data, there is no clear indication that one is better than the other.

Table 2 indicates polymers with and without anhydride have generally comparable adhesion values. Adhesion based on sealing at 230° C. is somewhat more variable and lower than adhesion values at 260° C. Nevertheless, there is no clear change when anhydride monomer is present. Flexural modulus values also indicate the presence of anhydride does not produce any clear change.

There are no examples of copolymers containing an alkyl acrylate and the further comonomers. However, the further comonomer or comonomers will be effective in stabilizing acid copolymers which also contain an alkyl acrylate.

TABLE 1

THERMAL STABILITY OF ANHYDRIDE-CONTAINING ACID COPOLYMERS

| Polymer # | Composition (wt. %) | Weight percent | MI initial | MI after 290°/60 min. | MI ratio |
|---|---|---|---|---|---|
| 1 | E/MAA/MAH | 87.5/11.9/0.6 | 31 | 20 | 0.645 |
| 2 | E/MAA/MAME | 85.8/13.1/1/1 | 31.1 | 24.1 | 0.775 |
| 3 | E/MAA/MAH | 87.2/12.0/0.8 | 34.4 | 28.4 | 0.816 |
| 4 | E/MAA/MAH | 88.0/11.1/0.9 | 23.7 | 18.3 | 0.772 |
| 5 | E/MAA/MAH | 93.9/5.7/0.4 | 43.9 | 38.1 | 0.868 |
| 6 | E/MAA/MAME | 92.0/7.4/0.6 | 17.1 | 12.2 | 0.713 |
| 7 | E/MAA/MAH | 83.4/15.8/0.8 | 100.6 | 73.1 | 0.727 |
| 8 | E/MAA/MAH | 89.5/10.0/0.5 | 6.65 | 3.75 | 0.564 |
| 9 | E/MAA/MAH | 91.5/8.1/0.4 | 23.4 | 15 | 0.641 |
| 10 | E/MAA/MAH | 87.3/11.8/0.9 | 10.9 | 7.6 | 0.697 |
| 1C | E/MAA | 90.0/10.0 | 10.3 | 4.8 | 0.466 |
| 11 | E/AA/MAH | 90.4/8.9/0.7 | 12.1 | 6.74 | 0.557 |
| 2C | E/AA | 91.8/8.2 | 9.4 | 3.57 | 0.380 |
| 3C-P | E/MAA | 91.0/9.0 | 9.1 | 4.6 | 0.505 |
| 4C-P | E/MAA | 91.0/9.0 | 8.6 | 3.4 | 0.395 |
| 5C-P | E/MAA | 90.0/10.0 | 33 | 15.5 | 0.470 |
| 6C-P | E/MAA | 85.0/15.0 | 45.3 | 24.8 | 0.547 |
| 7C-P | E/AA | 91.0/9.0 | 10 | 5.29 | 0.529 |

E = Ethylene; MAA = Methacrylic acid; AA = Acrylic acid; MAH = Maleic anhydride; MAME = Monoethyl ester of maleic acid (ethyl hydrogen maleate).
Suffix -P = Commercial Plant material: All other samples pilot plant material.

TABLE 2

PROPERTIES OF ANHYDRIDE-CONTAINING ACID COPOLYMERS

| Polymer # | Seal Temp. °F. | Peel Strength to LLDPE (psi) | Peel Strength to 1 mil.Al foil | Flexural Modulus (Kpsi) |
|---|---|---|---|---|
| 10 | 230 | 0.21 | 0.57 | 13.1 |
|    | 250 | 1.37 | 0.72 |      |
| 1C | 230 | 0.78 | 0.17 | 14.1 |
|    | 250 | 0.75 | 0.46 |      |
| 11 | 230 | 0.76 | 0.98 | 13.5 |
|    | 250 | 1.52 | 1.41 |      |
| 2C | 230 | 0.54 | 0.66 | 13.1 |
|    | 250 | 1.72 | 1.71 |      |

I claim:

1. A composition, comprising:
an ethylene (meth)acrylic acid copolymer consisting essentially of ethylene and from 5 to 30 weight percent (meth)acrylic acid, the acid copolymer having additionally copolymerized intrachain units derived from a further comonomer selected from the group consisting of maleic anhydride, itaconic anhydride, methyl hydrogen maleate, ethyl hydrogen maleate, maleic acid, itaconic acid, and a mixture of any of these monomers,
the intrachain units from the further comonomer or comonomers being present at a level of 0.05 to 3.0 weight percent with respect to the copolymer, the MI of the copolymer being from 0.1 to 100 g/10 min.

2. The composition of claim 1 wherein the further comonomer is maleic anhydride or ethyl hydrogen maleate.

3. The composition of claim 1 wherein the further comonomer derived units are present at a level of from 0.3 to 1.5 weight percent.

4. The composition of claim 2 wherein the level of (meth)acrylic acid dervived units is 8 to 22 weight percent.

5. The composition of claim 2 wherein the MI of the copolymer is from 0.1 . to 20 g./10 min.

6. The composition of claim 5 which contains only ethylene, (meth)acrylic acid and the further comonomer.

* * * * *